(12) United States Patent
Lee

(10) Patent No.: US 11,453,013 B2
(45) Date of Patent: Sep. 27, 2022

(54) VARIABLE BIDIRECTIONAL ELECTROSTATIC FILTER SYSTEM WITH ADJUSTABLE DISTANCE BETWEEN CHARGING PART AND DUST COLLECTING PART

(71) Applicant: ROYAL INDUSTRIAL TECH CORP, Seoul (KR)

(72) Inventor: Seung Whan Lee, Gyeonggi-do (KR)

(73) Assignee: ROYAL INDUSTRIAL TECH CORP, Seoul (KR)

(*) Notice: Subject to any disclaimer, the term of this patent is extended or adjusted under 35 U.S.C. 154(b) by 283 days.

(21) Appl. No.: 16/843,226

(22) Filed: Apr. 8, 2020

(65) Prior Publication Data
US 2020/0376498 A1 Dec. 3, 2020

(30) Foreign Application Priority Data
May 31, 2019 (KR) .......................... 10-2019-0064423

(51) Int. Cl.
| | |
|---|---|
| *B03C 3/82* | (2006.01) |
| *B03C 3/47* | (2006.01) |
| *B03C 3/41* | (2006.01) |
| *B03C 3/02* | (2006.01) |
| *B01D 46/00* | (2022.01) |

(52) U.S. Cl.
CPC ............ *B03C 3/82* (2013.01); *B01D 46/0032* (2013.01); *B03C 3/025* (2013.01); *B03C 3/41* (2013.01); *B03C 3/47* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,639,781 A | * | 5/1953 | Savitz ....................... | B03C 3/12 |
| | | | | 200/61.03 |
| 9,126,221 B2 | * | 9/2015 | Link ........................ | B03C 3/08 |

FOREIGN PATENT DOCUMENTS

| | | |
|---|---|---|
| CN | 108405187 A | 8/2018 |
| CN | 208098376 U | 11/2018 |

(Continued)

OTHER PUBLICATIONS

Chinese Search Report for CN 10-2019-0064423, dated May 31, 2019.

*Primary Examiner* — Christopher P Jones
*Assistant Examiner* — Sonji Turner
(74) *Attorney, Agent, or Firm* — Moser Taboada

(57) ABSTRACT

A variable bidirectional electrostatic filter system with an adjustable distance between a charging part and a dust collecting part is provided herein and includes a high voltage applying means configured to supply a high voltage; a filter housing; a dust collecting part; a forward charging part; a reverse charging part; a forward movement rail installed in the filter housing and configured to adjust a distance from an amplification section while forming the amplification section between the forward charging part and the dust collecting part; a reverse movement rail installed in the filter housing; and a control unit providing an amplification section, in which the charged capturing targets are agglomerated, between the charging part and the dust collecting part and by adjusting the distance from the amplification section prevents unnecessary waste of energy and maintain dust collecting efficiency.

8 Claims, 12 Drawing Sheets

(56) References Cited

FOREIGN PATENT DOCUMENTS

| KR | 10-0708547 B1 | 4/2007 | |
|---|---|---|---|
| KR | 10-20130029220 A | 3/2013 | |
| KR | 101610240 B1 * | 4/2016 | ............... B03C 3/12 |
| KR | 10-2017-0027603 A | 3/2017 | |
| KR | 10-1745207 B1 | 6/2017 | |

* cited by examiner

VARIABLE BIDIRECTIONAL ELECTROSTATIC FILTER SYSTEM WITH ADJUSTABLE DISTANCE BETWEEN CHARGING PART AND DUST COLLECTING PART

CROSS-REFERENCE TO RELATED APPLICATIONS

This application claims priority under 35 U.S.C. § 119(a) to Korean Patent Application Serial No. 10-2019-0064423, which was filed in the Korean Intellectual Property Office on May 31, 2019, the entire content of which is incorporated herein by reference.

BACKGROUND

The present invention relates to a bidirectional electrostatic filter system including a discharge electrode and a dust collecting part to charge dust by corona discharge and attract and collect the charged dust to a dust collecting electrode by Coulomb force, and particularly, to a bidirectional electrostatic filter system that improves dust collecting efficiency and reduces required energy by adjusting, in accordance with a situation, a distance between a charging part including a discharge electrode and a dust collecting part including a dust collecting electrode based on dust concentration.

An electric dust collecting principle of an electrostatic filter system typically called an electric dust collecting device will be briefly described. In general, the electric dust collecting device operates on the principle in which capturing targets such as dust or moisture particles included in contaminated gas are charged, and Coulomb force (electrostatic force) is applied to the charged capturing targets, such that the charged capturing targets are attracted and captured in a direction toward a dust collecting electrode.

Typically, the electrostatic filter system using the principle forms an electric field by a high voltage applied to a discharge electrode, and there occurs corona discharge, which is a phenomenon in which a portion having an intense electric field by the high voltage has conductivity between the two electrodes, such that electric charges are created and moved at the periphery of the discharge electrode, thereby charging the dust which is the capturing target.

The charged dust and the like receives force by the Coulomb force generated in the direction toward the dust collecting electrode in the electric field, and as a result, the charged dust and the like are attracted to the dust collecting electrode and captured by being attached to a surface of the dust collecting electrode.

Usually, there are a single-stage type electrostatic filter system and a two-stage type electrostatic filter system as the electrostatic filter system using the electric dust collecting principle.

The single-stage type electrostatic filter system is configured by integrating a discharge part and a dust collecting part, called a Cottrell dust collector, and most universally used currently as an air pollution prevention means.

Typically, the single-stage type electrostatic filter system operates between 30,000 V to 100,000 V, has a simple structure, and is excellent in dust collecting performance, and thus the single-stage type electrostatic filter system is widely and currently used as an industrial dust discharge prevention device that prevents the discharge of liquid-phase and solid-phase particles produced in various types of industrial plants.

However, the single-stage type electrostatic filter system is effective in preventing the dust from scattering again because the single-stage type electrostatic filter system repeatedly charges and collects the dust, but there are problems in that back corona occurs, and a high voltage needs to be applied to the dust collecting electrode, and when the dust collecting electrode is discharged, a dust collecting ability thereof is lost.

In addition, when the dust is captured on the dust collecting electrode and a dust layer having a thickness up to about 8 mm to 12.7 mm is formed, the captured dust needs to be rapped to consistently maintain the dust collecting ability, and as a result, there is a problem in that it is necessary to necessarily add a sprinkler device or a malleting device for applying mechanical impact or vibration.

If the dust is not rapped, the back corona occurs, and the charged dust is neutralized, and as a result, there is a problem in that a dust collecting performance greatly deteriorates, and the captured dust is neutralized and scattered again.

The two-stage type electrostatic filter system is configured such that a discharge part and a dust collecting part are separated. When an electric field is formed by a difference in voltage between a discharge electrode of the discharge part and a dust collecting electrode of the dust collecting part and charged particles are introduced into the electric field through the discharge part, the charged particles are attracted to and captured by the dust collecting electrode of the dust collecting part.

Because the discharge part, the dust collecting part, and the electric field are separated, the two-stage type electrostatic filter system is mainly used to treat exhaust gas having comparatively low dust concentration.

Meanwhile, the two-stage type electrostatic filter system is advantageous in that the back corona does not occur, but there are problems in that the dust, which scatters again, is discharged as it is, and a structure of the two-stage type electrostatic filter system is relatively complicated.

In order to solve the problems with the single-stage type electrostatic filter system and the two-stage type electrostatic filter system, Korean Patent Application No. 10-2005-0127542 entitled "Electric Dust Collecting Device Using Induced Voltage" has been disclosed in the related art.

The related art is characterized in that dust collecting electrodes are grounded, and an induced voltage plate is included, which generates induced voltage induced by a protrusion-type discharge electrode independently present without electrical connection. The induced voltage plate is installed between the dust collecting electrodes, such that an electrostatic field is formed to additionally apply propulsive force to the charged dust that is attracted to the grounded dust collecting electrode by the Coulomb force, and the dust collecting ability is increased.

According to the related art, the protrusion-type discharge electrode having a serrated shape is substituted for a wire-shaped discharge electrode, such that mechanical strength is increased, and a relatively wide charged region is formed.

In addition, because the dust collecting electrode is grounded, the charged dust is neutralized at the moment when the charged dust is attached to the dust collecting electrode, and the neutralized dust falls from the dust collecting electrode by gravity. Therefore, a separate dust removing means for removing the dust attached to the dust collecting electrode is not required.

Therefore, there is an effect in that the maintenance is easily performed, the dust collecting device is easily assembled because a structure of an electric filter thereof is simplified, and manufacturing costs of the electric dust collecting device are reduced.

The electric dust collecting device using the induced voltage is advantageous in improving the problem in comparison with the single-stage type electrostatic filter system and the two-stage type electrostatic filter system. Regarding the dust collecting performance, the electric dust collecting device exhibits the dust collecting efficiency of about 95 to 96% when operating at 15,000 bolt (V). However, there is a problem in that the electric dust collecting device cannot structurally exhibit the dust collecting efficiency higher than about 95 to 96%.

Meanwhile, the related art made by improving the single-stage type electrostatic filter system and the two-stage type electrostatic filter system has the above-mentioned effect, but has a problem in that because the charging part and the dust collecting part are fixedly installed, the dust collecting efficiency varies due to variables such as a flow velocity, dust concentration, a voltage, and the like.

That is, according to the electrostatic filter system in the related art, because the charging part and the dust collecting part are installed to be very close to each other, capturing targets are charged while passing through the charging part, and immediately enter the dust collecting part.

Therefore, the dust collecting efficiency can be sufficiently maintained when the electrostatic filter system operates under a designed condition, but there occurs a problem in that the dust collecting efficiency deteriorates, for example, if the flow velocity is higher than a design value, the dust concentration is high, or the voltage is low.

In addition, because the operation of the electrostatic filter system cannot organically cope with the dust collecting situation, there occurs a problem in that the dust collecting efficiency deteriorates and energy and facilities are unnecessarily wasted.

In order to solve the above-mentioned problems, there is a need for a new electrostatic filter system capable of maintaining dust collecting efficiency and reducing unnecessary waste of energy and facilities by organically coping with the varying dust collecting situation.

SUMMARY

The present invention has been made in an effort to solve the above-mentioned problems in the related art, and an object of the present invention is to provide a variable bidirectional electrostatic filter system capable of organically capturing charged capturing targets in accordance with a dust collecting situation by providing an amplification section, in which the charged capturing targets are agglomerated, between a charging part and a dust collecting part and by adjusting a distance from the amplification section.

In addition, another object of the present invention is to provide a variable bidirectional electrostatic filter system that reduces unnecessary energy and maintains dust collecting efficiency as it is by organically coping with the dust collecting situation.

In addition, still another object of the present invention is to provide a variable bidirectional electrostatic filter system that reduces unnecessary facilities and maintains dust collecting efficiency as it is by preventing excessive installation of the dust collecting facilities by organically coping with a dust collecting situation.

The other objects of the present invention may be understood from the features of the present invention, more clearly ascertained through the exemplary embodiments of the present invention and implemented by a means and a combination disclosed in the claims.

In order to solve the problems to be solved by the present invention, the present invention has the following technical features.

In accordance with the present invention a variable bidirectional electrostatic filter system with an adjustable distance between a charging part and a dust collecting part includes: a high voltage applying means configured to supply a high voltage; a filter housing configured to provide a flow path through which contaminated air flows in a forward direction or a reverse direction, and to provide an installation space therein; a dust collecting part installed in the filter housing and made by alternately and continuously installing dust collecting electrodes and voltage plates in parallel, the dust collecting electrode being formed of an grounded metal plate and configured to capture charged fine particles, and the voltage plate being formed of a metal plate connected to the high voltage applying means and configured to form an electric field; a forward charging part configured as an ionizer installed in a forward direction of the dust collecting part, connected to the high voltage applying means, and having multiple protrusions formed in a serrated shape having a predetermined length in a longitudinal direction to charge fine particles through corona discharge; a reverse charging part configured as an ionizer installed in a reverse direction of the dust collecting part, connected to the high voltage applying means, and having multiple protrusions formed in a serrated shape having a predetermined length in the longitudinal direction to charge fine particles through corona discharge; a forward movement rail installed on the filter housing, fastened so that the forward charging part is moved forward and rearward, and configured to adjust a distance from an amplification section while forming the amplification section between the forward charging part and the dust collecting part; a reverse movement rail installed in the filter housing, fastened so that the reverse charging part is moved forward and rearward, and configured to adjust a distance from an amplification section while forming the amplification section between the reverse charging part and the dust collecting part; and a control unit configured to control an operation of the high voltage applying means.

In addition, the filter housing of 'the variable bidirectional electrostatic filter system with the adjustable distance between the charging part and the dust collecting part' according to the present invention may have a rectangular parallelepiped shape elongated in a direction in which air flows, have a forward inlet hole and a reverse inlet hole formed at both sides facing each other in the longitudinal direction, and have an opening-closing door that opens a lateral side based on the longitudinal direction.

In addition, the high voltage applying means of 'the variable bidirectional electrostatic filter system with the adjustable distance between the charging part and the dust collecting part' according to the present invention may further include a power cut-off unit operating configured to mechanically cut off a supply of power in conjunction with the opening-closing door of the filter housing when the opening-closing door begins to open.

In addition, the filter housing of 'the variable bidirectional electrostatic filter system with the adjustable distance between the charging part and the dust collecting part' according to the present invention may further include a sliding rail on which the dust collecting part is seated, and the dust collecting part is detached in a sliding manner by means of the opening-closing door of the filter housing.

In addition, each of the forward charging part and the reverse charging part of 'the variable bidirectional electrostatic filter system with the adjustable distance between the charging part and the dust collecting part' according to the present invention may be configured as a multi-cross-pin ionizer having multiple protrusions formed in a serrated shape having a predetermined length in the longitudinal direction to generate corona discharge, and having multiple lateral protrusions formed at both sides in the longitudinal direction.

In addition, each of the forward movement rail and the reverse movement rail of 'the variable bidirectional electrostatic filter system with the adjustable distance between the charging part and the dust collecting part' according to the present invention may further include a rail drive unit including an electric motor whose operation is controlled by the control unit.

In addition, 'the variable bidirectional electrostatic filter system with the adjustable distance between the charging part and the dust collecting part' according to the present invention may further include: a forward sensor installed at one side of the dust collecting part and configured to measure a contamination degree or a flow velocity of contaminated air introduced from the one side; and a reverse sensor installed at the other side of the dust collecting part and configured to measure a contamination degree or a flow velocity of contaminated air introduced from the other side.

In addition, the control unit of 'the variable bidirectional electrostatic filter system with the adjustable distance between the charging part and the dust collecting part' according to the present invention may further include: a charging part position control unit configured to automatically adjust a position of the forward charging part or the reverse charging part based on a preset value by controlling the rail drive unit based on a value detected by the forward sensor or the reverse sensor.

With the above technical solutions, the present invention has an effect in that it is possible to organically capture the charged capturing targets in accordance with the dust collecting situation by providing the amplification section, in which the charged capturing targets are agglomerated, between the charging part and the dust collecting part and by adjusting the distance from the amplification section.

In addition, the present invention has an effect in that it is possible to prevent unnecessary waste of energy and maintain the dust collecting efficiency as it is by organically coping with the dust collecting situation.

In addition, the present invention has an effect in that it is possible to reduce unnecessary facilities by preventing the excessive installation of the dust collecting facilities by organically coping with the dust collecting situation.

The other effects of the present invention may be understood from the features of the present invention, more clearly ascertained through the exemplary embodiments of the present invention and exhibited by a means and a combination disclosed in the claims.

REFERENCE NUMBERS

Figure 1:
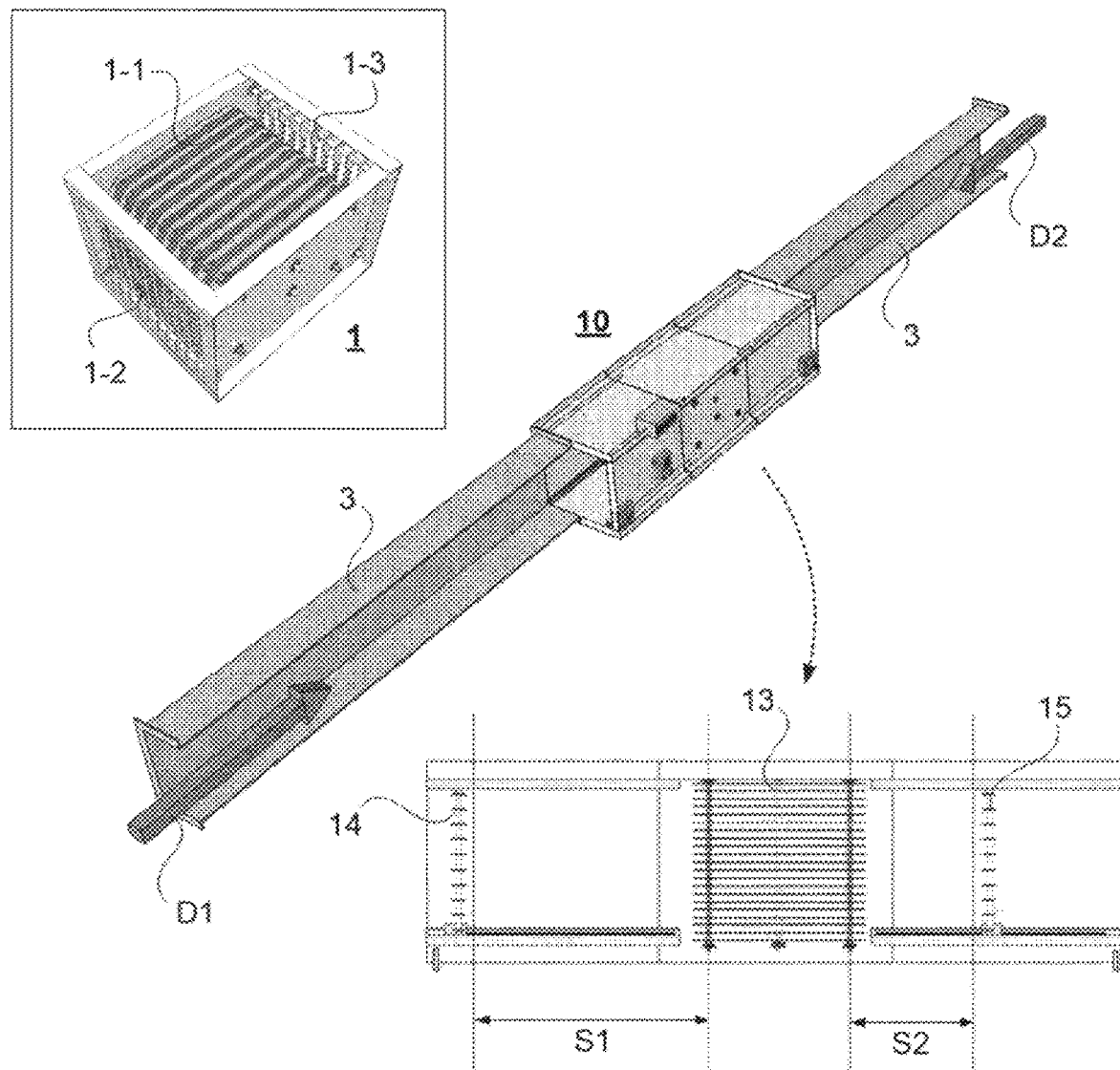
FIG. 1 is a view for explaining a feature of a variable bidirectional electrostatic filter system with an adjustable distance between a charging part and a dust collecting part according to the present invention.

1: Bidirectional electrostatic filter system in related art
3: Ventilation flue
10: Variable bidirectional electrostatic filter system according to present invention
11: High voltage applying means
12: Filter housing
13: Dust collecting part
14: Forward charging part
15: Reverse charging part
16: Forward movement rail
17: Reverse movement rail
18: Control unit
20: Rail drive unit
30: Forward sensor
40: Reverse sensor
50: Charging part position control unit
121: Forward inlet hole
122: Reverse inlet hole
123: Opening-closing door 124: Power cut-off unit
125: Sliding rail
100: Contaminated air
200: Contaminated air

DETAILED DESCRIPTION

The following detailed description of the present invention will be made with reference to the accompanying drawings illustrating specific exemplary embodiments for carrying out the present invention. These exemplary embodiments will be described in detail enough to carry out the present invention by those skilled in the art. It should be understood that various exemplary embodiments of the present invention are different from one another but need not be mutually exclusive. For example, particular shapes, structures, and characteristics described herein in respect to one exemplary embodiment may be implemented in other exemplary embodiments without departing from the technical spirit and scope of the present invention. In addition, it should be understood that the position or arrangement of each constituent element in the respective disclosed exemplary embodiments may be changed without departing from the technical spirit and scope of the present invention. Therefore, the following detailed description is not considered as having limited meanings, and the scope of the present invention is limited only by the appended claims as well as all the scopes equivalent to the features claimed in the appended claims. Like reference numerals in the drawings refer to the same or similar function throughout several aspects.

As illustrated in FIG. 1 for explaining features of a variable bidirectional electrostatic filter system with an adjustable distance between a charging part and a dust collecting part according to the present invention, a variable bidirectional electrostatic filter system 10 according to the present invention is a bidirectional electrostatic filter system in which air flows in both a forward direction D1 and a reverse direction D2 of a ventilation flue 3 in which the air flows. As illustrated in FIG. 1, the variable bidirectional electrostatic filter system 10 has a technical feature that distances between charging parts 14 and 15 and a dust collecting part 13 are adjusted.

That is, unlike a bidirectional electrostatic filter system 1 in the related art in which charging parts 1-2 and 1-3 and dust collecting part 1-1 are fixedly installed to be close to one another and do not provide the time and the space in which a charged capturing target may be amplified, the variable bidirectional electrostatic filter system 10 according to the present invention is characterized by providing amplification sections S1 and S2 in which the distances between the charging parts 14 and 15 the dust collecting part 13 are not fixed and are adjusted as the charging parts 14 and 15 are moved.

For example, the amplification sections S1 and S2 provide the time and the space in which charged fine particles may be agglomerated at the same operating voltage and the same flow velocity, such that the applied Coulomb force is increased as a charge quantity of the agglomerated fine particles is relatively increased, and as a result, there is an advantage in that dust collecting efficiency is relatively improved.

Therefore, in a case in which the dust concentration of the fine particles is increased or the flow velocity is increased under the same condition, the amplification sections S1 and S2 are formed to maintain the dust collecting efficiency.

In addition, the amplification sections S1 and S2 also serve to enable ultra-fine particles to be collected.

Hereinafter, exemplary embodiments of the variable bidirectional electrostatic filter system 10 according to the present invention having the above-mentioned technical features will be described below in detail.

Figure 2:
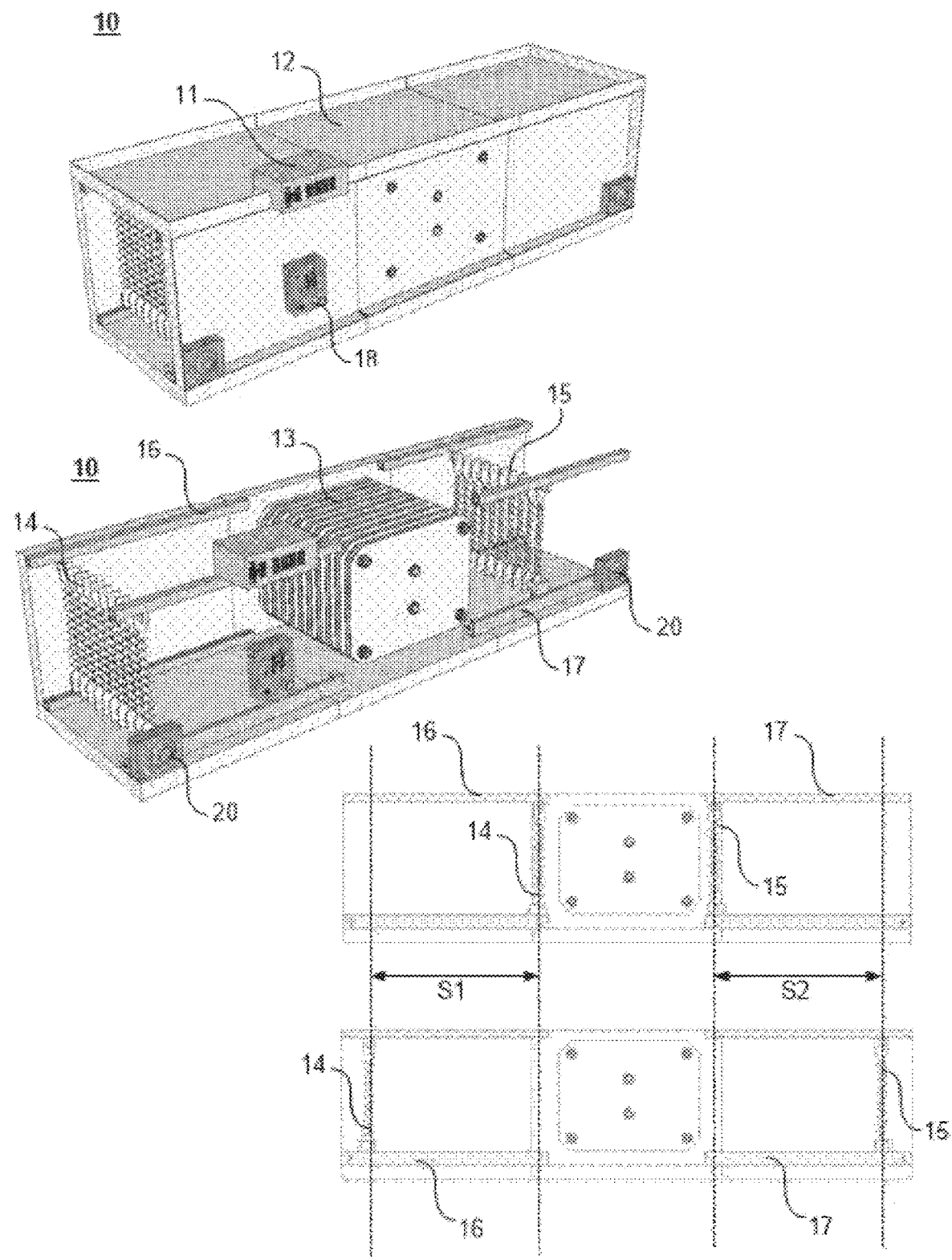
FIG. 2 is a view for explaining a configuration of the variable bidirectional electrostatic filter system with the adjustable distance between the charging part and the dust collecting part according to the present invention.

As illustrated in FIG. 2 for explaining a configuration of the variable bidirectional electrostatic filter system with the adjustable distance between the charging part and the dust collecting part according to the present invention, the variable bidirectional electrostatic filter system 10 according to the present invention includes a high voltage applying means 11, a filter housing 12, the dust collecting part 13, the forward charging part 14, the reverse charging part 15, forward movement rails 16, reverse movement rails 17, and a control unit 18, and the above-mentioned constituent elements are organically coupled as illustrated in FIG. 2.

The high voltage applying means 11 is connected to an external power source to supply the forward charging part 14 and the reverse charging part 15 with electric charges with a high direct current voltage of 11,000 bolts (V) or more so that corona discharge may occur in the forward charging part 14 and the reverse charging part 15, and the high voltage applying means 11 also supplies a high voltage to the dust collecting part 13.

The high voltage applying means 11 is not limited to any specified high voltage supply means and may be one of various high voltage applying means. The high voltage applying means 11 supplies the electric charges to the forward charging part 14 and the reverse charging part 15 based on a control signal from the control unit 18, supplies high-voltage electric currents to the dust collecting part 13 as necessary, and automatically cuts off the supply of power in the event of emergency such as an operation of an emergency switch.

As illustrated in FIGS. 1 and 2, the filter housing 12 provides a flow path through which contaminated air flows in the forward direction D1 or the reverse direction D2 and provides therein an installation space in which the dust collecting part 13, the forward charging part 14, the reverse charging part 15, the forward movement rails 16, and the reverse movement rails 17 are installed.

The filter housing 12 is not limited to a housing made of any specified material and may be made of various materials including metal.

Figure 3:
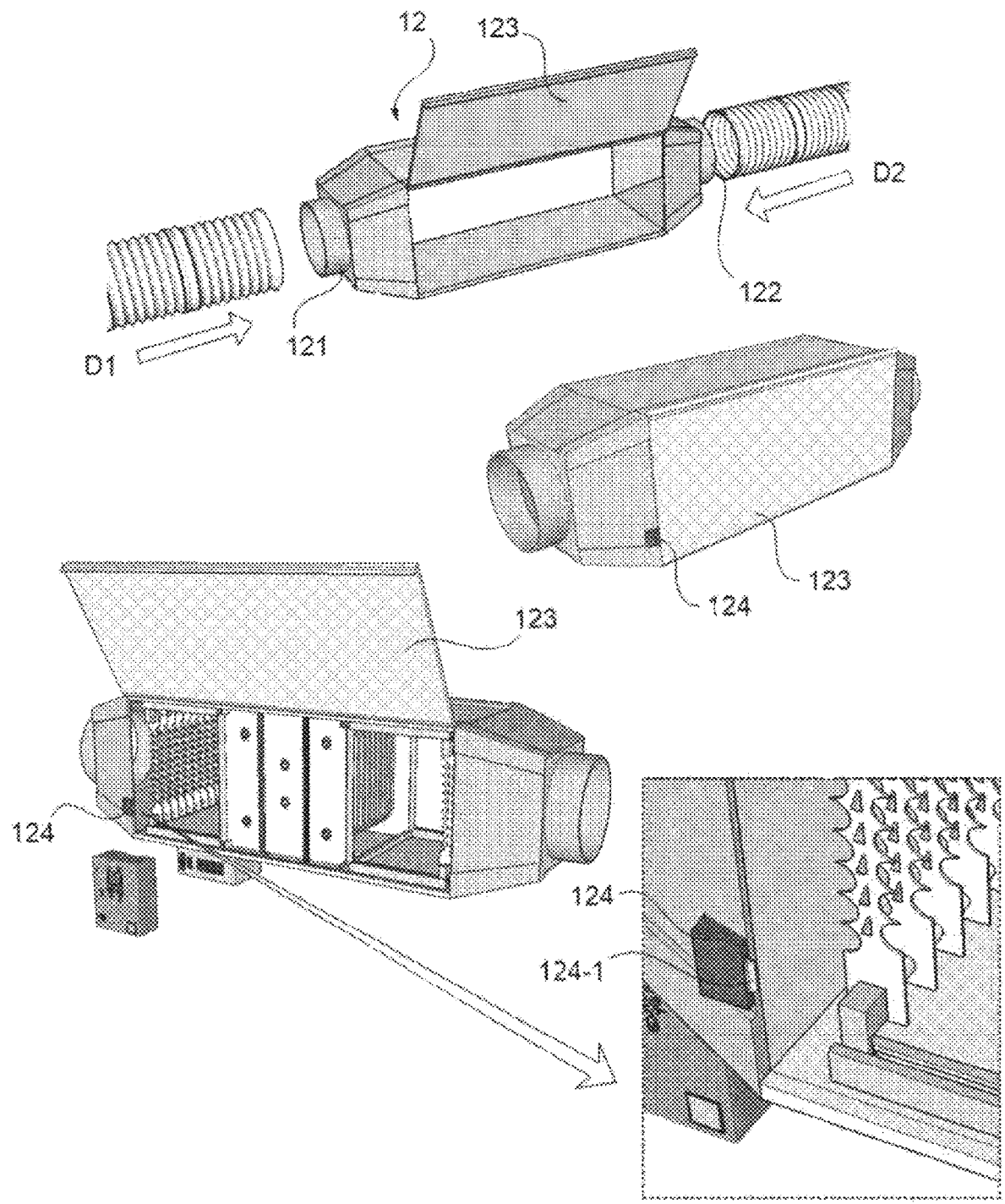
FIG. 3 is a view for explaining a filter housing of the variable bidirectional electrostatic filter system with the adjustable distance between the charging part and the dust collecting part according to the present invention.

Meanwhile, as illustrated in FIG. 3 for explaining the filter housing of the variable bidirectional electrostatic filter system with the adjustable distance between the charging part and the dust collecting part according to the present invention, the filter housing 12 may have a rectangular parallelepiped shape elongated in a direction in which the air flows, have a forward inlet hole 121 and a reverse inlet hole 122 at both sides facing each other in a longitudinal direction, and have an opening-closing door 123 that opens a lateral side of the filter housing 12 based on the longitudinal direction.

The opening-closing door 123 may be sized such that the entire lateral side of the filter housing 12 is opened, in order to make it convenient to maintain and repair the dust collecting part 13, the forward charging part 14, the reverse charging part 15, the forward movement rails 16, and the reverse movement rails 17 installed in the filter housing 12.

In addition, the filter housing 12 according to the present invention further includes a power cut-off unit 124 configured to mechanically cut off the supply of power in conjunction with the opening-closing door 123 when the opening-closing door 123 begins to be opened.

The power cut-off unit 124 is a safety means for cutting off the supply of power in the event of emergency when the opening-closing door 123 of the filter housing 12 is opened, and various power cut-off means, which operate in conjunction with the opening-closing door 123, may be applied.

For example, as illustrated in FIG. 3, the power cut-off unit 124 has a protruding switch 124-1, such that the protruding switch 124-1 is connected to the power source by being pushed by the opening-closing door 123 in the state in which the opening-closing door 123 is closed. When the opening-closing door 123 is opened, the protruding switch 124-1 automatically protrudes, such that the supply of power may be cut off.

Figure 4:
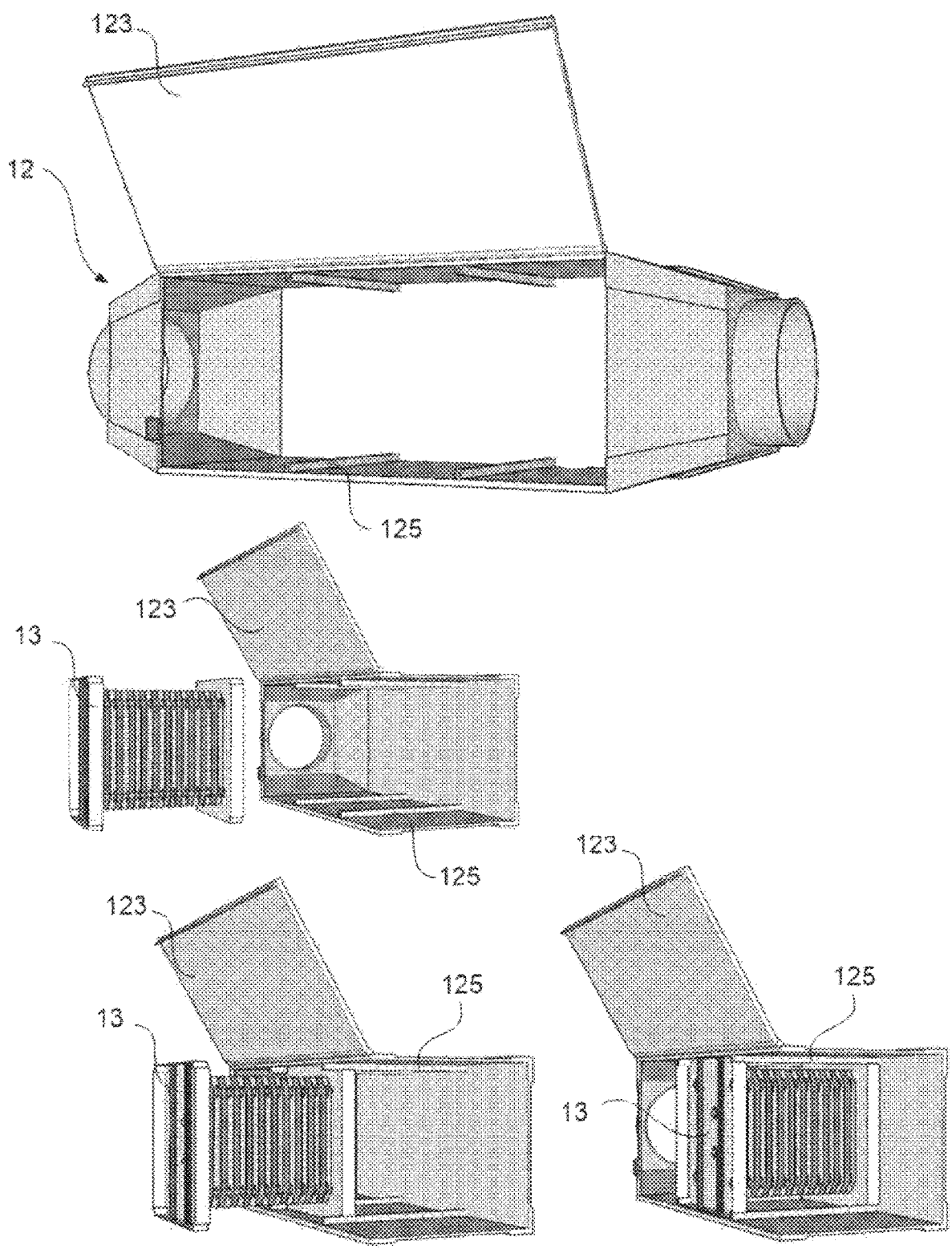
FIG. 4 is a view illustrating an exemplary embodiment of the filter housing of the variable bidirectional electrostatic filter system with the adjustable distance between the charging part and the dust collecting part according to the present invention.

In addition, as illustrated in FIG. 4 illustrating an exemplary embodiment of the filter housing of the variable bidirectional electrostatic filter system with the adjustable distance between the charging part and the dust collecting part according to the present invention, the filter housing 12 of the variable bidirectional electrostatic filter system 10 according to the present invention may further include sliding rails 125.

That is, because the dust collecting part 13 is frequently detached to remove dust from the dust collecting part 13 installed in the filter housing 12, the sliding rails 125 are used as means for more easily detaching the dust collecting part 13, as illustrated in FIG. 4.

That is, the dust collecting part 13 placed on the sliding rails 125 is easily moved into the filter housing 12 by the sliding rails 125.

Figure 5:
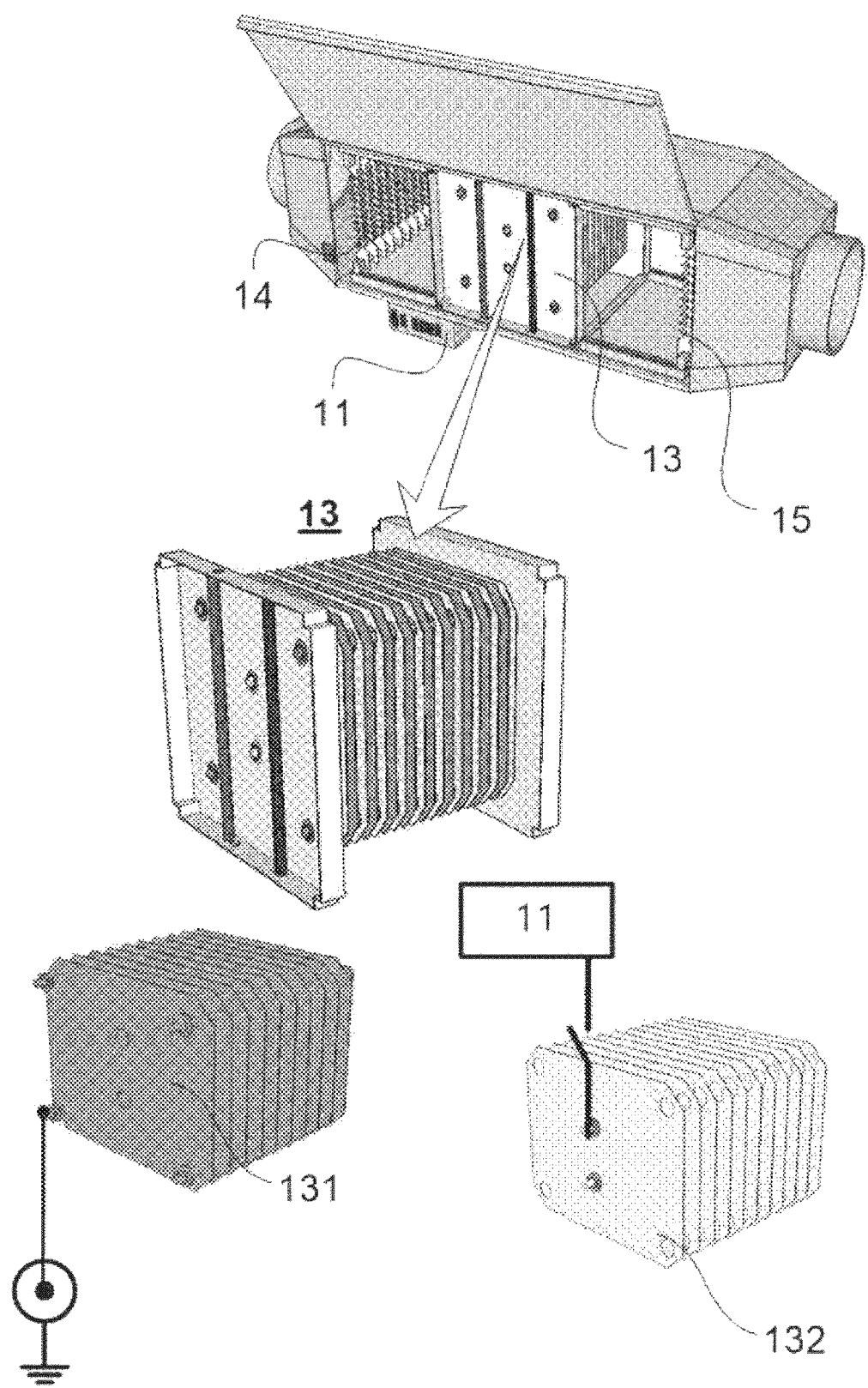
FIG. 5 is a view for explaining a dust collecting part of the variable bidirectional electrostatic filter system with the adjustable distance between the charging part and the dust collecting part according to the present invention.

As illustrated in FIG. 5 for explaining the dust collecting part of the variable bidirectional electrostatic filter system with the adjustable distance between the charging part and the dust collecting part according to the present invention, the dust collecting part 13 is installed between the forward charging part 14 and the reverse charging part 15 and made by alternately and continuously installing dust collecting electrodes 131 and voltage plates 132 in parallel, the dust collecting electrode 131 is formed of an grounded metal plate and captures charged fine particles, and the voltage plate 132 is formed of a metal plate connected to the high voltage applying means 11 and forms an electric field.

In this case, as illustrated in FIG. 5, the dust collecting electrodes 131 and the voltage plates 132 are alternately disposed, such that electric field regions are formed between the dust collecting electrodes 131 and the voltage plates 132.

Therefore, fine dust (+) charged by the forward charging part 14 or the reverse charging part 15 receives force by Coulomb force generated in the direction toward the dust collecting electrode 131 in an electric field between the grounded dust collecting electrode 141 (−) and the voltage plate 142 (+) supplied with a direct current of 5 KV to 6 KV. As a result, the dust is attracted to the dust collecting electrode 131 and captured by being attached to a surface of the dust collecting electrode 131.

Figure 6A:
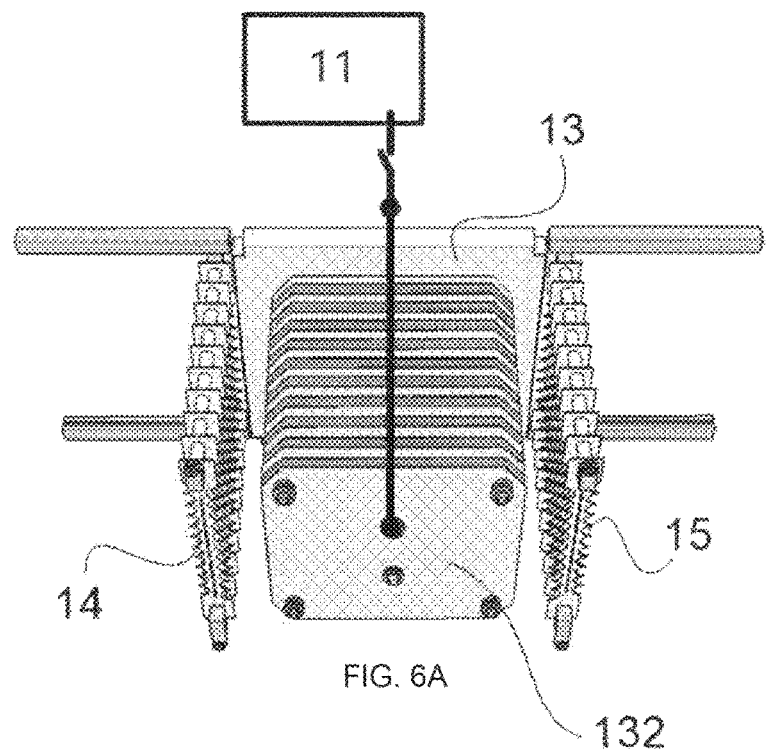
FIGS. 6A and 6B are views for explaining the connection with a high voltage applying means of the dust collecting part of the variable bidirectional electrostatic filter system with the adjustable distance between the charging part and the dust collecting part according to the present invention.
Figure 6B:
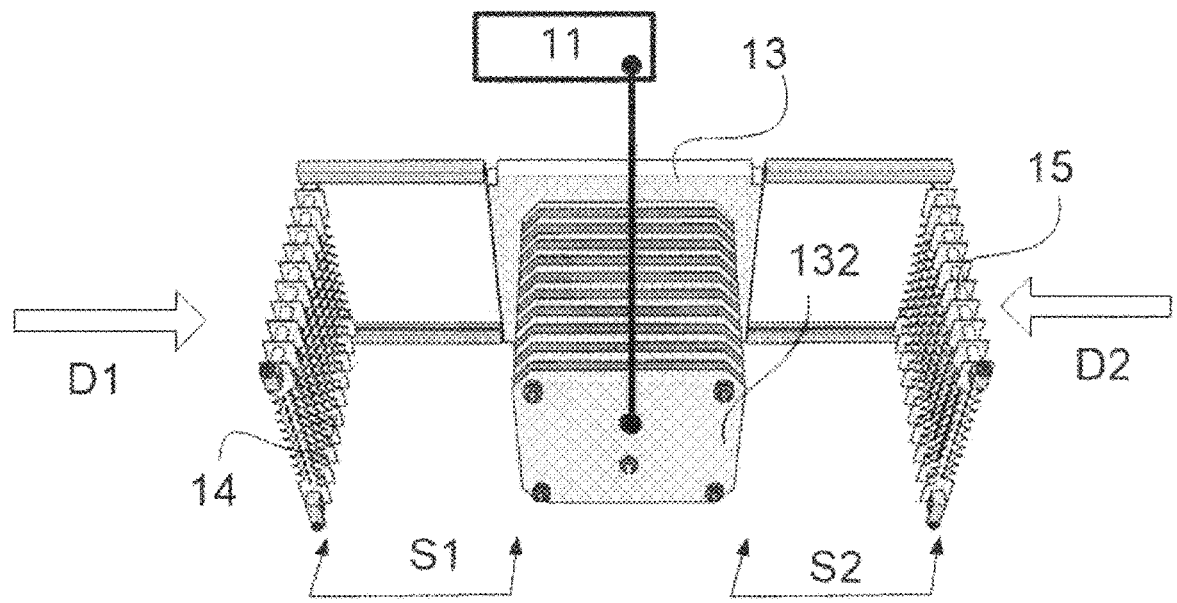

Meanwhile, as illustrated in FIG. 6A for explaining the connection with the high voltage applying means of the dust collecting part of the variable bidirectional electrostatic filter system with the adjustable distance between the charging part and the dust collecting part according to the present invention, when the forward charging part 14 or the reverse charging part 15 is positioned to be close to the dust collecting part 13, an induced voltage is generated on the voltage plate 132 of the dust collecting part 13, such that the voltage plate 132 is not supplied with power from the high voltage applying means 11. As illustrated in FIG. 6B, when the distance between the dust collecting part 13 and the forward charging part 14 or the reverse charging part 15 is increased to provide the amplification sections S1 and S2 in which the charged fine dust is agglomerated, the voltage plate 132 is supplied with power from the high voltage applying means 11.

Figure 7:
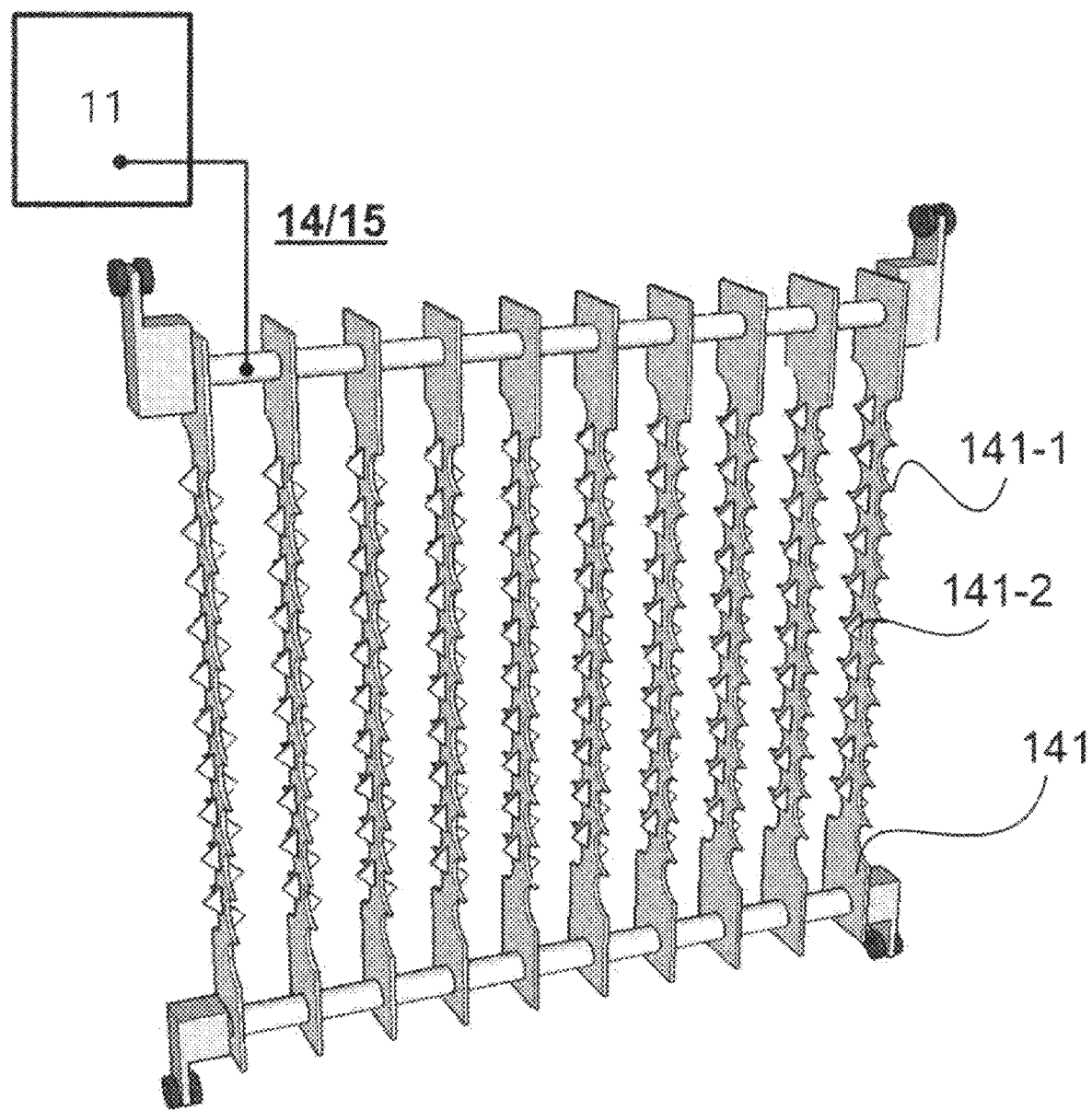
FIG. 7 is a view for explaining a charging part of the variable bidirectional electrostatic filter system with the adjustable distance between the charging part and the dust collecting part according to the present invention.

As illustrated in FIGS. 6A and 6B, the forward charging part 14 installed in the forward direction D1 of the dust collecting part 13 and the reverse charging part 15 installed in the reverse direction D2 of the dust collecting part 13 are various corona discharge means capable of charging the fine dust and the like and may be configured as ionizers having multiple protrusions formed in a serrated shape having a predetermined length in the longitudinal direction. However, as illustrated in FIG. 7 for explaining the charging part of the variable bidirectional electrostatic filter system with the adjustable distance between the charging part and the dust collecting part according to the present invention, each of the forward charging part 14 and the reverse charging part 15 may be configured as multi-cross-pin ionizers 141 each having multiple protrusions 141-1 formed in a serrated shape with a predetermined length in the longitudinal direction, and having multiple lateral protrusions 141-2 formed at both sides in the longitudinal direction to generate corona discharge, in order to form a relatively wide charged region.

In this case, the multi-cross-pin ionizer 141 forms the charged region by being supplied with the direct current of 10 KV to 12 KV from the high voltage applying means 11, and the fine dust passing through the charged region is charged with (+) electricity.

Figure 8:
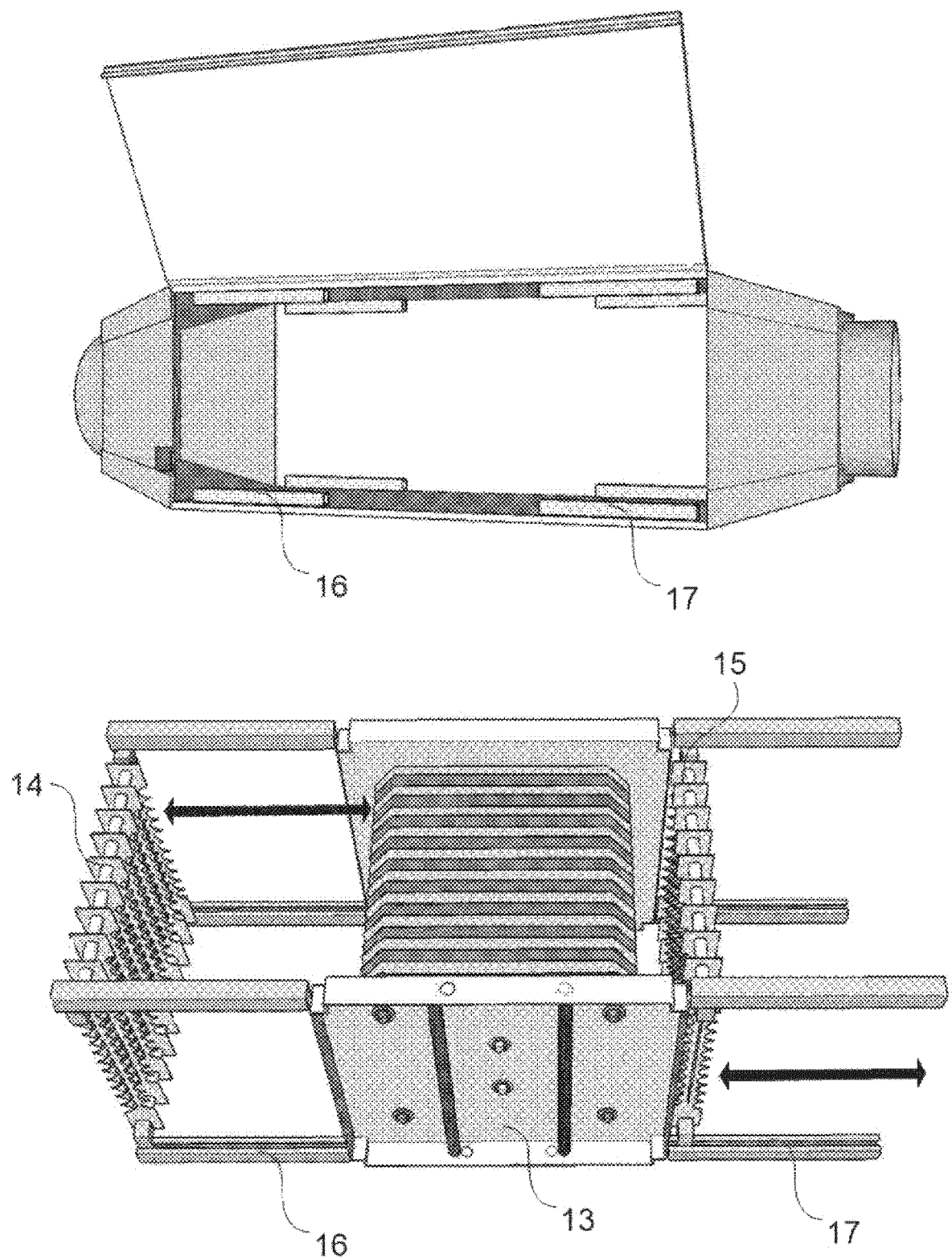
FIG. 8 is a view for explaining movement rails of the variable bidirectional electrostatic filter system with the adjustable distance between the charging part and the dust collecting part according to the present invention.

As illustrated in FIG. 8 for explaining the movement rails of the variable bidirectional electrostatic filter system with the adjustable distance between the charging part and the dust collecting part according to the present invention, the forward charging part 14 and the reverse charging part 15 may be moved in the filter housing 12 by the forward movement rails 16 and the reverse movement rails 17.

That is, as illustrated in FIG. 8, the forward movement rails 16 and the reverse movement rails 17 are installed in the filter housing 12 so that the distance toward the dust collecting part 13 may be adjusted. As illustrated in FIG. 8, the forward charging part 14 fastened to the forward movement rails 16 and the reverse charging part 15 fastened to the reverse movement rails 17 are positioned to be close to the dust collecting part 13 to generate the induced voltage or spaced apart from the dust collecting part 13 at a predetermined distance to provide the amplification section.

In this case, each of the forward movement rail 16 and the reverse movement rail 17 may be fastened to the forward charging part 14 or the reverse charging part 15 and thus serve as a movement rail means having various structures and shapes in which the forward charging part 14 and the reverse charging part 15 may be moved along the movement rails.

Meanwhile, as illustrated in FIG. 2, each of the forward movement rail 16 and the reverse movement rail 17 may further include a rail drive unit 20 including an electric motor whose operation is controlled by the control unit 18.

Figure 9A:
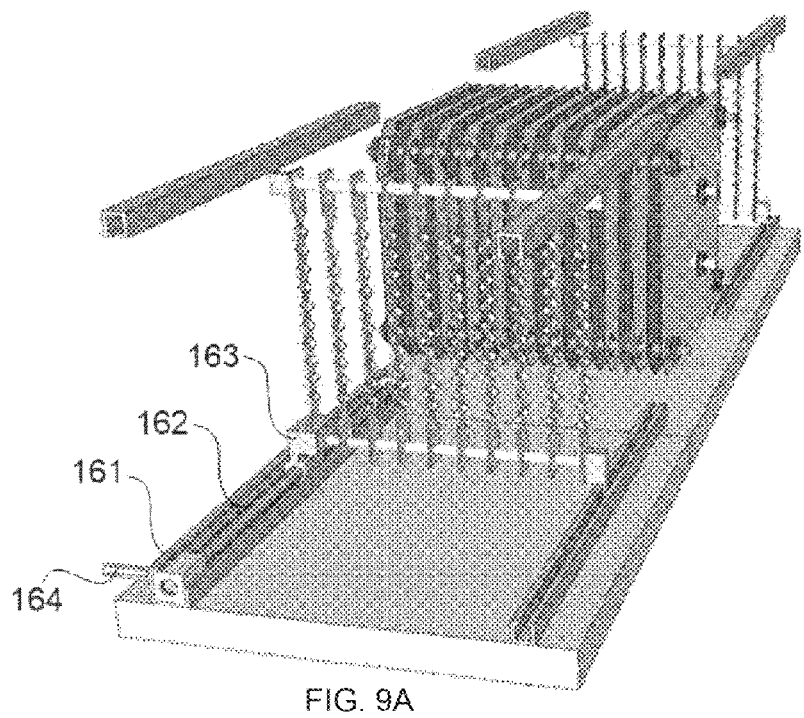
FIGS. 9A and 9B are views for explaining an exemplary embodiment of the movement rails of the variable bidirectional electrostatic filter system with the adjustable distance between the charging part and the dust collecting part according to the present invention.
Figure 9B:
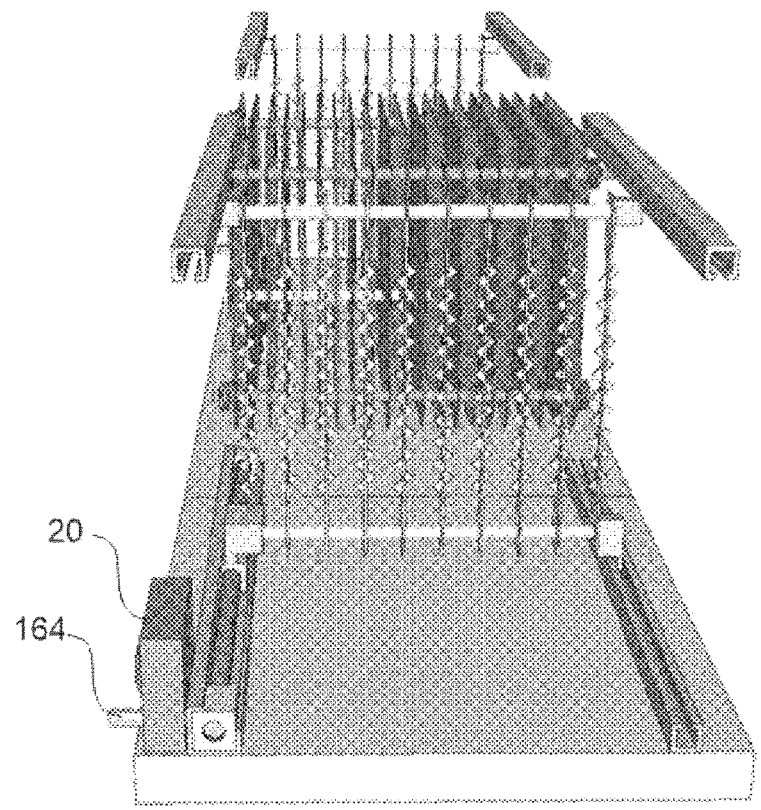

As described above, as illustrated in FIG. 9A for explaining an exemplary embodiment of the movement rail of the variable bidirectional electrostatic filter system with the adjustable distance between the charging part and the dust collecting part according to the present invention, each of the forward movement rail 16 and the reverse movement rail 17 includes, as a configuration for manually moving the forward charging part 14 and the reverse charging part 15 fastened to the forward movement rail 16 and the reverse movement rail 17, includes a gear box 161, a conveying screw 162 connected to the gear box 161, a conveying block 163 coupled to the forward charging part 14 or the reverse charging part 15 while being moved along the conveying screw 162 by a rotation of the conveying screw, and a key 164 connected to the gear box 161 and coupled to a rotation tool for rotating the conveying screw 162. As illustrated in FIG. 9B, each of the forward movement rail 16 and the reverse movement rail 17 may include the rail drive unit 20 configured to rotate the key 164 by using force from the electric motor.

That is, in order to further improve a dust collecting performance in accordance with a state of the contaminated air at the time of operating the system, the variable bidirectional electrostatic filter system 10 according to the present invention provides the amplification section by forming the space between the dust collecting part 13 and the forward charging part 14 or the reverse charging part 15, thereby relatively improving the dust collecting performance. In order to relatively improve energy efficiency, the forward charging part 14 or the reverse charging part 15 is positioned to be close to the dust collecting part 13, such that the induced voltage is generated to collect the dust, thereby improving energy efficiency.

As illustrated in FIG. 2, the control unit 18 controls the operation of the high voltage applying means 11 to control a supply of the high-voltage electric current to the forward charging part 14, the reverse charging part 15, and the voltage plate 132 of the dust collecting part 13 through the high voltage applying means 11, thereby controlling the operation of the variable bidirectional electrostatic filter system 10 according to the present invention.

As described above, as illustrated in FIG. 10 for explaining sensors of the variable bidirectional electrostatic filter system with the adjustable distance between the charging part and the dust collecting part according to the present invention, an indoor air purification system 10 according to the present invention further includes a forward sensor 30 and a reverse sensor 40.

Figure 10:
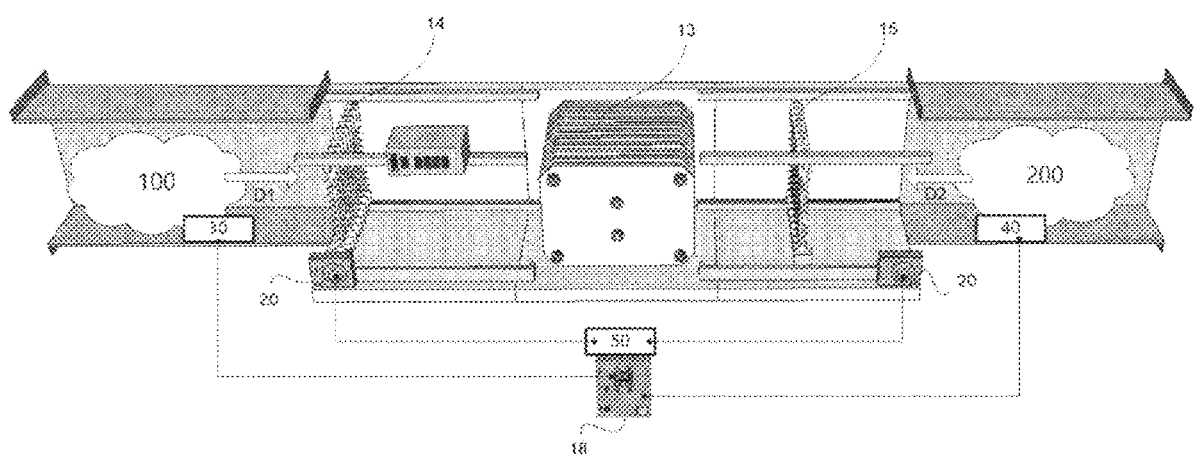
FIG. 10 is a view for explaining sensors of the variable bidirectional electrostatic filter system with the adjustable distance between the charging part and the dust collecting part according to the present invention.

As illustrated in FIG. 10, the forward sensor 30 is installed at one side (forward side, D1) of the dust collecting part 13 and measures a contamination degree such as fine dust concentration or a flow velocity of contaminated air 100 introduced from one side.

As illustrated in FIG. 10, the reverse sensor 40 is installed at the other side (reverse side, D2) of the dust collecting part 13 and measures a contamination degree such as fine dust concentration or a flow velocity of contaminated air 200 introduced from the other side.

With the forward sensor 30 and the reverse sensor 40, the contamination degree or the flow velocity of the contaminated air 100 and 200 to be purified is detected, and a state of the contaminated air 100 and 200 to be purified is recognized based on a detected value, such that the air may be more effectively purified by adjusting the positions of the forward charging part 14 and the reverse charging part 15.

Meanwhile, the control unit 18 may further include a charging part position control unit 50 configured to automatically adjust, based on a preset value, the position of the forward charging part 14 or the reverse charging part 15 by controlling the rail drive unit 20 based on a value detected by the forward sensor 30 or the reverse sensor 40.

That is, for example, the charging part position control unit 50 changes the position of the forward charging part 14 or the reverse charging part 15 by controlling the rail drive unit 20 to form the amplification section having a predetermined distance based on a value set in advance in accordance with the fine dust concentration and the flow velocity. Hereinafter, the feature of a dust collecting principle in accordance with the formed amplification section of the variable bidirectional electrostatic filter system 10 according to the present invention will be described.

Figure 11:
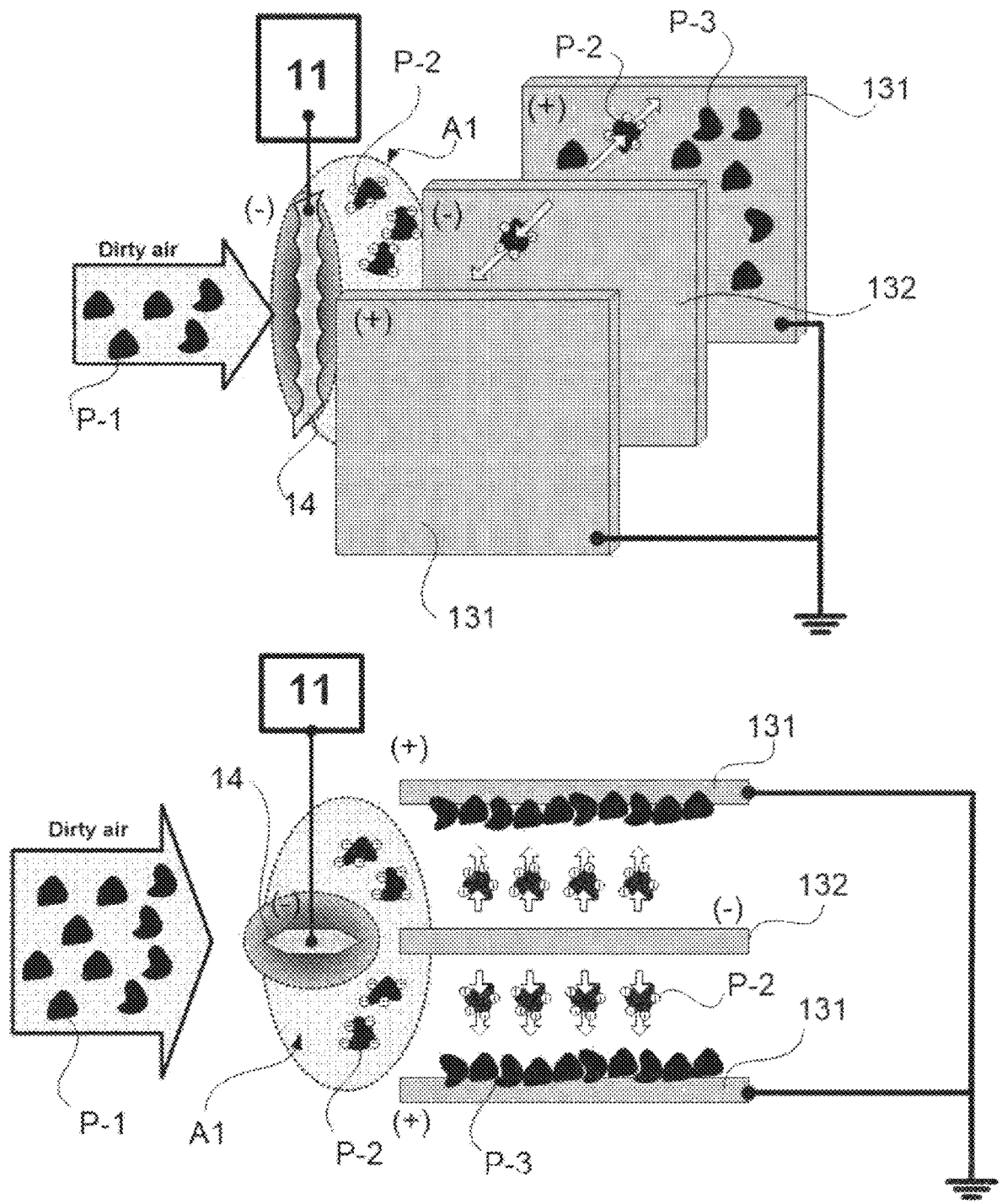
FIG. 11 is a view for explaining a feature of Operation Example 1 of the variable bidirectional electrostatic filter system with the adjustable distance between the charging part and the dust collecting part according to the present invention.
Figure 12:
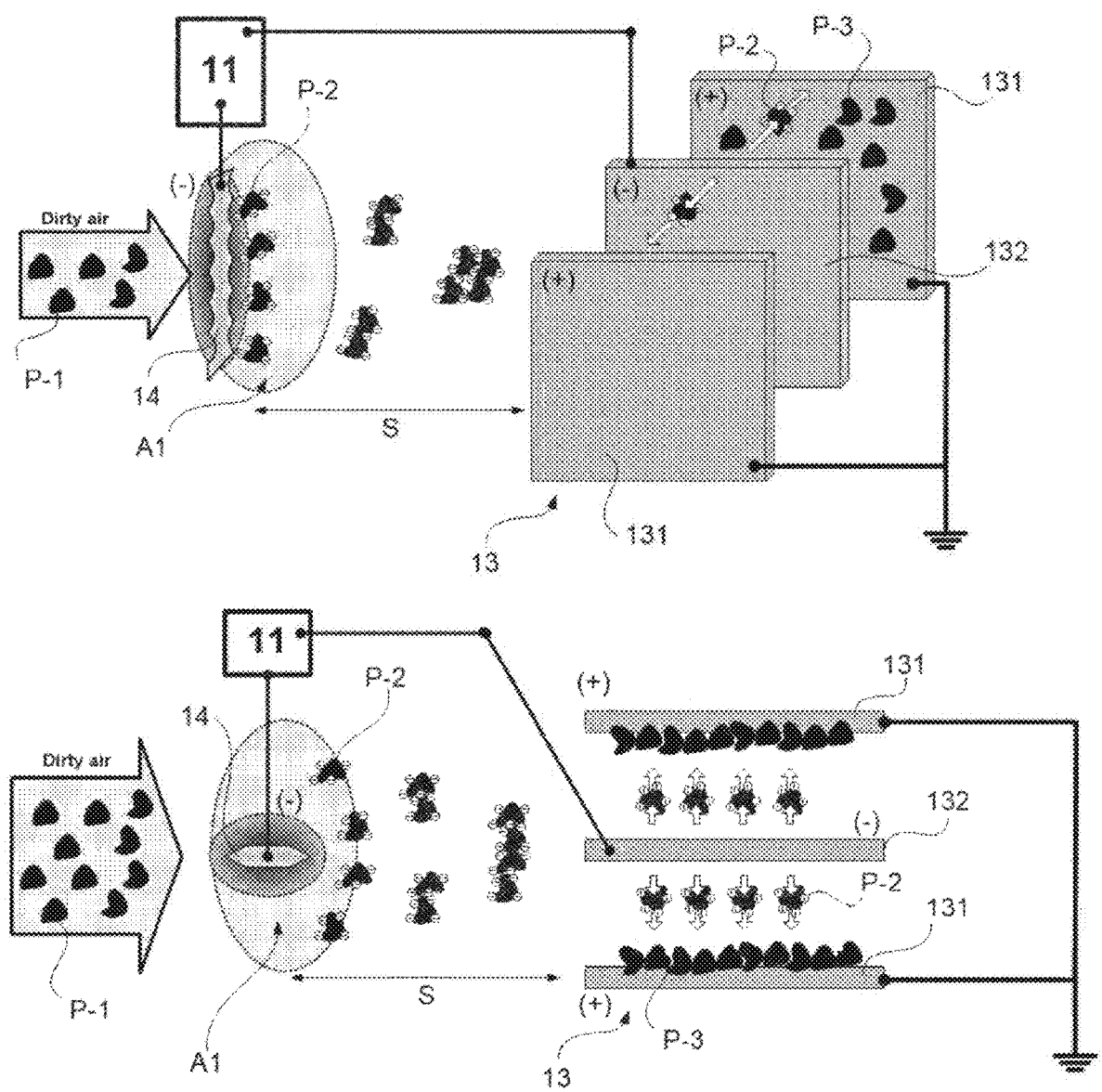
FIG. 12 is a view for explaining a feature of Operation Example 2 of the variable bidirectional electrostatic filter system with the adjustable distance between the charging part and the dust collecting part according to the present invention.

FIG. 11 is a view for explaining a feature of Operation Example 1 of the variable bidirectional electrostatic filter system with the adjustable distance between the charging part and the dust collecting part according to the present invention, and FIG. 12 is a view for explaining a feature of Operation Example 2 of the variable bidirectional electrostatic filter system with the adjustable distance between the charging part and the dust collecting part according to the present invention.

Operation Example 1 of the variable bidirectional electrostatic filter system 10 according to the present invention conceptually illustrated in FIG. 11 is an operation example in which the forward charging part 14 or the reverse charging part 15 is positioned to be close to the dust collecting part 13 to generate the induced voltage on the voltage plate 132 of the dust collecting part 13 and collect the dust. Operation Example 2 of the variable bidirectional electrostatic filter system 10 according to the present invention conceptually illustrated in FIG. 12 is an operation example in which the forward charging part 14 or the reverse charging part 15 is positioned to be spaced apart from the dust collecting part 13 at a predetermined distance to form the amplification section S and the voltage plate 132 of the dust collecting part 13 collects the dust by being supplied with the high-voltage electric current from the high voltage applying means 11.

As illustrated in FIG. 11 conceptually illustrating Operation Example 1, in order to electrically collect the dust by using the induced voltage, the forward charging part 14 is supplied with electric charges with a high direct current voltage of 11,000 bolts or more from the high voltage applying means 11, and the electric charges applied with the high voltage are charged with electricity at protrusion portions formed on the ionizers of the forward charging part 14, and the electric charges are discharged through corona discharge, thereby forming a charged region A2.

In this case, fine particles 1 such as dust, moisture, or the like included in the contaminated air introduced from the outside are in an electrically neutral state. When the neutral fine particles 1 enter a charged region A1, the neutral fine particles 1 collide with and are adsorbed to gas molecules having negative ions and become charged fine particles 2 in a negative state.

The principle in which the fine particles 1 are charged will be briefly described. An intense electric field is formed around the forward charging part 14 by the corona discharge, the intense electric field accelerates free electrons present in the peripheral gas, the accelerated free electrons collide with other gas molecules while moving at a high speed, and the gas molecule, which has collided with the accelerated free electron in this manner, becomes a positive ion by discharging one more free electron.

The gas molecule, which becomes the positive ion formed as described above, moves toward the forward charging part 14 and collides with the gas molecule, which surrounds the ionizer of the forward charging part 14, or the ionizer itself. In this case, the newly generated free electron moves along the electric field toward the grounded dust collecting electrode 131. When the free electron moving in this manner comes out of the corona region, the electric field is weakened, and a movement speed is rapidly decreased. As a result, the free electron collides with the gas molecule at a speed that cannot ionize the gas molecule, and the free electron is adsorbed to the surface of the gas molecule, thereby forming a gas molecule having a negative ion.

The gas molecules having the negative ions collide with and are adsorbed to the fine particles 2 in the charged region A1, thereby charging the fine particles 2.

At the same time, the plate-shaped voltage plate 132, which is spaced apart from the forward charging part 14 in parallel at a predetermined interval, generates the induced voltage of the negative electrode by the forward charging part 14, and the two grounded dust collecting electrodes 131 are charged as positive electrodes through electrostatic induction and electrostatic discharge.

Therefore, the electric field is formed between the respective dust collecting electrodes 131 and the voltage plate 132, attractive force is applied between charged fine particles 2-1 introduced into the electric field and the dust collecting electrodes 131 and repulsive force is applied between the charged fine particles 2-1 introduced into the electric field and the voltage plate 132, such that the charged fine particles 2-1 are attracted and attached to the dust collecting electrode 131.

In this way, as the charged fine particles 2-1 are attracted and attached to the grounded dust collecting electrode 131, captured fine particles 3 loses electric charges and become electrically neutral fine particles.

In this case, since the repulsive force and the attractive force are the force generated based on the Coulomb's law, a detailed description thereof will be omitted herein.

Operation Example 1 has been described only regarding the forward direction D1, but the same applies to the reverse direction D2.

Meanwhile, as illustrated in FIG. 12 conceptually illustrating Operation Example 2 of the present invention, the configuration in which the forward charging part 14 is supplied with electric charges with a high direct current voltage of 11,000 bolts or more from the high voltage applying means 11, the electric charges applied with the high voltage are charged with electricity at the protrusion portions formed on the ionizers of the forward charging part 14, and the electric charges are discharged through the corona discharge to form the charged region A2 is identical to the configuration of Operation Example 1. However, as illustrated in FIG. 11, the forward charging part 14 is spaced apart from the dust collecting part 13 at a predetermined distance to form the amplification section S having a predetermined distance, as illustrated in FIG. 11.

When the neutral fine particles 1 such as dust, moisture, and the like included in the contaminated air introduced from the outside enter the charged region A1 of the amplification section S, the neutral fine particles 1 collide with and are adsorbed to gas molecules having negative ions in the neutral state, such that the neutral fine particles 1 become the charged fine particles 2 in the negative state. The charged fine particles 2 are agglomerated while passing through the amplification section S and become the fine particles 2 including a larger quantity of electric charges, and as a result, the higher force generated based on the Coulomb's law is applied due to a larger quantity of charges.

At the same time, the plate-shaped voltage plate 132 receives the electric current from the high voltage applying means 11 and becomes a negative electrode, and the two grounded dust collecting electrodes 131 are charged as positive electrodes.

Therefore, the electric field is formed between the respective dust collecting electrodes 131 and the voltage plate 132, attractive force is applied between charged fine particles 2-1 introduced into the electric field and the dust collecting electrodes 131 and repulsive force is applied between the charged fine particles 2-1 introduced into the electric field and the voltage plate 132, such that the charged fine particles 2-1 are attracted and attached to the dust collecting electrode 131.

In this way, as the charged fine particles 2-1 are attracted and attached to the grounded dust collecting electrode 131, captured fine particles 3 loses electric charges and become electrically neutral fine particles.

Operation Example 2 has been described only regarding the forward direction D1, but the same applies to the reverse direction D2.

While the exemplary embodiments of the present invention have been described above, the technical spirit of the present invention is not limited thereto, and it is apparent to those skilled in the art to which the present invention pertains that the exemplary embodiments may be modified or altered without departing from the scope of the appended claims, and the modification or the alteration belongs to the appended claims.

What is claimed is:

1. A variable bidirectional electrostatic filter system with an adjustable distance between a charging part and a dust collecting part, the variable bidirectional electrostatic filter system comprising:
    a high voltage applying means configured to supply a high voltage;
    a filter housing configured to provide a flow path through which contaminated air flows in a forward direction or a reverse direction and to provide an installation space therein;
    a dust collecting part installed in the filter housing and made by alternating dust collecting electrodes and voltage plates in parallel, the dust collecting electrode being formed of an grounded metal plate and configured to capture charged fine particles, and the voltage plates being formed of a metal plate connected to the high voltage applying means and configured to form an electric field;
    a first charging part configured as an ionizer installed in a first direction of the dust collecting part, connected to the high voltage applying means, and having multiple protrusions formed in a serrated shape having a predetermined length in a longitudinal direction to charge fine particles through corona discharge;
    a second charging part configured as an ionizer installed in a second direction, which is opposite the first direction of the dust collecting part, connected to the high voltage applying means, and having multiple protrusions formed in a serrated shape having a predetermined length in the longitudinal direction to charge fine particles through corona discharge;
    a first movement rail installed on the filter housing, fastened so that the first charging part is moved in the first direction and in the second direction, and configured to adjust a distance from an amplification section while forming the amplification section between the first charging part and the dust collecting part;
    a second movement rail installed in the filter housing, fastened so that the second charging part is moved in the first direction and in the second direction, and configured to adjust a distance from an amplification section while forming the amplification section between the second charging part and the dust collecting part; and
    a control unit configured to control an operation of the high voltage applying means.

2. The variable bidirectional electrostatic filter system of claim 1, wherein the filter housing has a rectangular parallelepiped shape elongated in a direction in which air flows, has a forward inlet hole and a reverse inlet hole formed at both sides facing each other in the longitudinal direction, and has an opening-closing door that opens a lateral side based on the longitudinal direction.

3. The variable bidirectional electrostatic filter system of claim 2, wherein the high voltage applying means further comprises a power cut-off unit configured to mechanically cut off a supply of power in conjunction with the opening-closing door of the filter housing when the opening-closing door begins to open.

4. The variable bidirectional electrostatic filter system of claim 2, wherein the filter housing further comprises a sliding rail on which the dust collecting part is seated, and the dust collecting part is detached in a sliding manner by means of the opening-closing door of the filter housing.

5. The variable bidirectional electrostatic filter system of claim 1, wherein each of the first charging part and the second charging part is configured as a multi-cross-pin ionizer having multiple protrusions formed in a serrated shape, having a predetermined length in the longitudinal direction to generate corona discharge, and having multiple lateral protrusions formed at both sides in the longitudinal direction.

6. The variable bidirectional electrostatic filter system of claim 1, wherein each of the first movement rail and the second movement rail further comprises a rail drive unit comprising an electric motor whose operation is controlled by the control unit.

7. The variable bidirectional electrostatic filter system of claim 6, further comprising:
    a forward sensor installed at one side of the dust collecting part and configured to measure a contamination degree or a flow velocity of contaminated air introduced from one side; and
    a reverse sensor installed at the other side of the dust collecting part and configured to measure a contamination degree or a flow velocity of contaminated air introduced from the other side.

8. The variable bidirectional electrostatic filter system of claim 7, wherein the control unit further comprises a charging part position control unit configured to automatically adjust a position of the first charging part or the second charging part based on a preset value by controlling the rail drive unit based on a value detected by the forward sensor or the reverse sensor.

* * * * *